United States Patent
Lee et al.

(10) Patent No.: US 9,320,002 B2
(45) Date of Patent: *Apr. 19, 2016

(54) LOW DUTY CYCLE NETWORK CONTROLLER

(71) Applicant: QUALCOMM Incorporated, San Diego, CA (US)

(72) Inventors: Chong Uk Lee, San Diego, CA (US); Alejandro Raul Holcman, San Diego, CA (US); Jeremy M. Stein, Haifa (IL); Ramin Rezaiifar, San Diego, CA (US); Babak Aryan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/073,263

(22) Filed: Nov. 6, 2013

(65) Prior Publication Data

US 2014/0071859 A1 Mar. 13, 2014

Related U.S. Application Data

(60) Division of application No. 13/230,555, filed on Sep. 12, 2011, now Pat. No. 8,605,630, and a continuation of application No. 11/766,068, filed on Jun. 20, 2007, now Pat. No. 8,018,884.

(60) Provisional application No. 60/815,879, filed on Jun. 23, 2006.

(51) Int. Cl.
*H04W 56/00* (2009.01)
*H04B 7/24* (2006.01)
(Continued)

(52) U.S. Cl.
CPC ............. *H04W 56/0015* (2013.01); *H04B 7/24* (2013.01); *H04J 3/06* (2013.01); *H04W 52/028* (2013.01)

(58) Field of Classification Search
CPC ... H04W 56/0015; H04W 52/028; H04J 3/06; H04B 7/24
USPC .......................................... 370/277, 311, 350
See application file for complete search history.

(56) References Cited

U.S. PATENT DOCUMENTS

| | | | |
|---|---|---|---|
| 5,276,703 A | 1/1994 | Budin et al. |
| 5,748,103 A | 5/1998 | Flach et al. |

(Continued)

FOREIGN PATENT DOCUMENTS

| | | |
|---|---|---|
| CA | 2433110 C | 6/2004 |
| CN | 1323495 A | 11/2001 |

(Continued)

OTHER PUBLICATIONS

International Search Report—PCT/US07/071808—International Search Authority—European Patent Office, Jan. 7, 2008.

(Continued)

*Primary Examiner* — Brian D Nguyen
(74) *Attorney, Agent, or Firm* — Mahmoud Munes Tomeh (57) ABSTRACT

Operating at least one low duty cycle (LDC) controller to maintain synchronization between the LDC controller and a plurality of LDC terminals operating over a communication network using only overhead channels of the network and conforming to the protocol and timing of said network, wherein synchronization between the LDC controller and the plurality of LDC terminals is maintained separately from the protocol and timing of the communication network, and enables the LDC controller to schedule power down and wake up of the plurality of LDC terminals for durations longer than allowable under the protocol and timing of the communication network.

24 Claims, 7 Drawing Sheets

(51) Int. Cl.
*H04J 3/06* (2006.01)
*H04W 52/02* (2009.01)

(56) References Cited

U.S. PATENT DOCUMENTS

| | | | |
|---|---|---|---|
| 5,748,104 A | 5/1998 | Argyroudis et al. | |
| 5,797,094 A | 8/1998 | Houde et al. | |
| 6,154,500 A | 11/2000 | Dorenbosch et al. | |
| 6,397,053 B1* | 5/2002 | Ghiazza | 455/343.1 |
| 6,449,491 B1 | 9/2002 | Dailey | |
| 6,463,307 B1 | 10/2002 | Larsson et al. | |
| 6,480,476 B1 | 11/2002 | Willars | |
| 6,490,446 B1 | 12/2002 | Haartsen | |
| 6,687,501 B2 | 2/2004 | Soliman | |
| 7,027,425 B1 | 4/2006 | Fullerton et al. | |
| 7,027,796 B1 | 4/2006 | Linsky et al. | |
| 7,047,051 B2 | 5/2006 | Sackett et al. | |
| 7,301,477 B2* | 11/2007 | Isoyama et al. | 340/870.13 |
| 7,319,867 B2 | 1/2008 | Li | |
| 7,386,299 B2 | 6/2008 | Nakamura | |
| 7,394,782 B2* | 7/2008 | Davis | 370/324 |
| 7,412,265 B2 | 8/2008 | Chen et al. | |
| 7,457,973 B2 | 11/2008 | Liu | |
| 7,466,665 B2 | 12/2008 | Calcev et al. | |
| 7,508,781 B2 | 3/2009 | Liu et al. | |
| 7,558,605 B2 | 7/2009 | Lee et al. | |
| 7,565,181 B1 | 7/2009 | Hans et al. | |
| 7,747,258 B2 | 6/2010 | Farmer | |
| 7,945,234 B2 | 5/2011 | Lee et al. | |
| 8,018,884 B2 | 9/2011 | Lee et al. | |
| 8,443,083 B2 | 5/2013 | Khushu et al. | |
| 8,509,859 B2 | 8/2013 | Jarosinski et al. | |
| 8,605,630 B2* | 12/2013 | Lee et al. | 370/277 |
| 2001/0027378 A1 | 10/2001 | Tennison et al. | |
| 2002/0016190 A1 | 2/2002 | Higuchi et al. | |
| 2002/0058528 A1 | 5/2002 | Hunzinger | |
| 2003/0109268 A1 | 6/2003 | Fraser et al. | |
| 2003/0148800 A1 | 8/2003 | Lee | |
| 2003/0227382 A1* | 12/2003 | Breed | 340/539.13 |
| 2004/0024879 A1 | 2/2004 | Dingman et al. | |
| 2004/0174270 A1 | 9/2004 | Choi | |
| 2004/0198255 A1 | 10/2004 | Hayashida | |
| 2004/0218556 A1 | 11/2004 | Son et al. | |
| 2004/0225892 A1 | 11/2004 | Bear et al. | |
| 2005/0054389 A1 | 3/2005 | Lee et al. | |
| 2005/0055418 A1 | 3/2005 | Blanc et al. | |
| 2005/0060089 A1 | 3/2005 | Garin et al. | |
| 2005/0108589 A1 | 5/2005 | Kadatch et al. | |
| 2005/0129009 A1 | 6/2005 | Kitchin | |
| 2005/0190723 A1 | 9/2005 | Rao et al. | |
| 2005/0197125 A1 | 9/2005 | Kang et al. | |
| 2006/0025181 A1 | 2/2006 | Kalofonos et al. | |
| 2006/0068750 A1 | 3/2006 | Burr | |
| 2006/0111825 A1 | 5/2006 | Okada et al. | |
| 2006/0120303 A1* | 6/2006 | Yarvis et al. | 370/254 |
| 2006/0120314 A1 | 6/2006 | Krantz et al. | |
| 2006/0223454 A1* | 10/2006 | Westwick et al. | 455/76 |
| 2006/0238417 A1 | 10/2006 | Jendbro et al. | |
| 2006/0280140 A9 | 12/2006 | Mahany et al. | |
| 2007/0008916 A1 | 1/2007 | Haugli et al. | |
| 2007/0053315 A1 | 3/2007 | Sugaya | |
| 2007/0057767 A1 | 3/2007 | Sun et al. | |
| 2007/0116033 A1* | 5/2007 | Reunamaki et al. | 370/445 |
| 2007/0127425 A1 | 6/2007 | Keidar et al. | |
| 2007/0127435 A1 | 6/2007 | Antony et al. | |
| 2007/0132751 A1* | 6/2007 | Claessen | 345/211 |
| 2007/0150599 A1 | 6/2007 | Neogi et al. | |
| 2007/0153876 A1 | 7/2007 | Pi et al. | |
| 2007/0248057 A1 | 10/2007 | Keidar et al. | |
| 2007/0274244 A1 | 11/2007 | Yoon et al. | |
| 2007/0291673 A1 | 12/2007 | Demirhan et al. | |
| 2008/0049700 A1* | 2/2008 | Shah et al. | 370/342 |
| 2008/0242313 A1 | 10/2008 | Lee et al. | |
| 2009/0129325 A1 | 5/2009 | Prakash et al. | |
| 2010/0015916 A1 | 1/2010 | Holcman et al. | |
| 2012/0257563 A1 | 10/2012 | Sinnarajah et al. | |
| 2014/0148159 A1 | 5/2014 | Lee et al. | |

FOREIGN PATENT DOCUMENTS

| | | |
|---|---|---|
| CN | 1464753 A | 12/2003 |
| CN | 1592292 A | 3/2005 |
| CN | 1740949 A | 3/2006 |
| CN | 1930793 A | 3/2007 |
| CN | 1933672 A | 3/2007 |
| CN | 101194232 A | 6/2008 |
| EP | 1158685 B1 | 10/2002 |
| JP | 1286528 | 11/1989 |
| JP | H1063979 A | 3/1998 |
| JP | 10094053 A | 4/1998 |
| JP | 10191424 | 7/1998 |
| JP | 10290193 A | 10/1998 |
| JP | 1175261 | 3/1999 |
| JP | 11313370 A | 11/1999 |
| JP | 2000078305 A | 3/2000 |
| JP | 2001357483 A | 12/2001 |
| JP | 2002544635 A | 12/2002 |
| JP | 2003516681 A | 5/2003 |
| JP | 2003244164 A | 8/2003 |
| JP | 2004040812 A | 2/2004 |
| JP | 2004185459 A | 7/2004 |
| JP | 2005135289 A | 5/2005 |
| JP | 2005328230 A | 11/2005 |
| JP | 2005535901 T | 11/2005 |
| JP | 2006513644 A | 4/2006 |
| JP | 2006174328 A | 6/2006 |
| JP | 2006254317 A | 9/2006 |
| JP | 2006270296 A | 10/2006 |
| JP | 2007067829 A | 3/2007 |
| JP | 2007507150 A | 3/2007 |
| RU | 2181229 C1 | 4/2002 |
| TW | 235564 B | 7/2005 |
| WO | WO-9619084 A1 | 6/1996 |
| WO | WO-97018639 | 5/1997 |
| WO | WO-9927465 A1 | 6/1999 |
| WO | WO-0010353 A1 | 2/2000 |
| WO | WO-0070572 A1 | 11/2000 |
| WO | WO-0128274 A1 | 4/2001 |
| WO | WO-0231989 | 4/2002 |
| WO | WO-02080483 A1 | 10/2002 |
| WO | WO-2004017092 A1 | 2/2004 |
| WO | WO-200406656 A1 | 8/2004 |
| WO | WO-2005032176 A1 | 4/2005 |
| WO | WO-2005096516 A1 | 10/2005 |
| WO | WO-2006115577 A1 | 11/2006 |
| WO | WO-2006119471 A2 | 11/2006 |

OTHER PUBLICATIONS

Panchabhai A M et al., "A Node Hibernation Protocol utilizing multiple transmit power levels for wireless sensor networks", Vehicular Technology Conference, 2004. VTC2004-Fall. 2004 IEEE 60th, IEEE, Sep. 29, 2004, vol. 4, pp. 2808-2813.

Ramanathan N et al., "A Stream-Oriented Power Management Protocol for Low Duty Cycle Sensor Network Applications", Embedded Networked Sensors, 2005. EmNetS-II. The Second IEEE Workshop on, IEEE, May 31, 2005, p. 53-62.

Written Opinion, PCT/US2007/071808, International Searching Authority, European Patentoffice, Jan. 7, 2008.

* cited by examiner

LOW DUTY CYCLE NETWORK CONTROLLER

CROSS-REFERENCE TO RELATED APPLICATIONS

The present application is a Divisional application of and claims priority to U.S. patent application Ser. No. 13/230,555, now U.S. Pat. No. 8,605,630, entitled "Low Duty Network Controller" filed Sep. 12, 2011, and assigned to the assignee hereof and hereby expressly incorporated by reference herein. U.S. patent application Ser. No. 13/230,555 is a continuation application of U.S. application Ser. No. 11/766,068, filed Jun. 20, 2007, now U.S. Pat. No. 8,018,884, entitled "Low Duty Cycle Network Controller," which claims the benefit of U.S. Provisional Application No. 60/815,679, filed Jun. 21, 2006, entitled "Low Duty Cycle Network Controller," both of which are incorporated herein by reference.

BACKGROUND

1. Field

The present invention generally relates to the transmission of data over telecommunication networks, and to telecommunication devices that enable such transmission. More particularly, the invention concerns a new technique for maintaining synchronization with a telecommunication device in a half-duplex mode for a low duty cycle data transmission operation.

2. Background

Remote monitoring of operations may involve remotely-situated, battery-operated, wireless telecommunication devices that capture operational status information and transmit via radio frequency signals the operational status information to a centrally-situated information-processing device. Oftentimes, the operational status information can be transmitted via radio frequency signals as short messages. In such remote monitoring and transmission applications, issues associated with power consumption management are an important concern.

In a typical operational environment, battery-operated monitoring and telecommunication devices are desirable to facilitate operating efficiency and to reduce maintenance costs Implementation efficiency is improved because batteries obviate arrangements for an external power source and enable deployment of self-contained units that are easily installed at a variety of sites. Maintenance costs are reduced because the unit lacks dependence on external power sources and because a faulty unit is easily replaced by another. To optimize these advantages, it is most desirable for the monitoring and telecommunication device to operate for an extended period of time without requiring battery replacement or the like.

One way to extend the life of a battery is to reduce the load demanded of it. For example, a remotely-situated telecommunication device may be configured to operate according to a reduced duty cycle, where it is placed in a sleep or low-power operational mode when there are no ongoing communications with, for example, a centrally-situated information-processing device. This usually requires that a trade-off be made between the availability of the battery-powered telecommunication device for communications with the information-processing device and the amount of achievable reduction in power consumption. However, a remote telecommunication device employing such a power consumption saving technique may not be able to communicate optimally with a centrally-situated information-processing device because all or part of its communication circuitry is shut down when the device is in sleep mode to conserve battery power. That is, communication by the remote device is available only on an occasional basis.

There is therefore a need in the art for means of synchronizing the exchange of information between a remotely-situated monitoring and transmission device configured to operate according to a low duty cycle, and a centrally-situated information-processing device with which it is in communication.

SUMMARY

In one aspect, a method of operating a low duty cycle (LDC) controller is disclosed. The method includes operating at least one low duty cycle (LDC) controller to maintain synchronization between the LDC controller and a plurality of LDC terminals operating over a communication network using only overhead channels of the network and conforming to the protocol and timing of the network, where the synchronization between the LDC controller and the plurality of LDC terminals is maintained separately from the protocol and timing of the communication network, and enables the LDC controller to schedule power down and wake up of the plurality of LDC terminals for durations longer than allowable under the protocol and timing of the communication network.

In another aspect, a low duty cycle (LDC) network system is disclosed. The system includes at least one LDC controller operating to maintain synchronization between the LDC controller and a plurality of LDC terminals operating over a communication network using only overhead channels of the network and conforming to the protocol and timing of the network, where the synchronization between the LDC controller and the plurality of LDC terminals is maintained separately from the protocol and timing of the communication network, and enables the LDC controller to schedule power down and wake up of the plurality of LDC terminals for durations longer than allowable under the protocol and timing of the communication network.

In another aspect, a tangible storage medium including a computer program for operating a network using at least one LDC controller is disclosed. The program comprises executable instructions that cause a computer to operate at least one low duty cycle (LDC) controller to maintain synchronization between the LDC controller and a plurality of LDC terminals operating over a communication network using only overhead channels of the network and conforming to the protocol and timing of the network, where the synchronization between the LDC controller and the plurality of LDC terminals is maintained separately from the protocol and timing of the communication network, and enables the LDC controller to schedule power down and wake up of the plurality of LDC terminals for durations longer than allowable under the protocol and timing of the communication network.

DETAILED DESCRIPTION

The nature, objectives, and advantages of the present invention will become more apparent to those skilled in the art after considering the following detailed description in connection with the accompanying drawings.

Introduction

In recognition of the above-stated problems associated with remote monitoring of operational status information and transmission of the information via radio frequency signals, the present disclosure describes several embodiments for controlling and synchronizing communications using only overhead channels of a telecommunication network (e.g., a cellular network such as a CDMA or GSM network) in a half-duplex mode. In particular, the operational status information is received by a controller hosted at a centrally-situated information-processing device, in messages transmitted in a half-duplex mode from a remotely-situated communication device configured to operate according to a low duty cycle (LDC).

In one implementation, the centrally-situated information-processing device at which a LDC controller is hosted is a processor located within or coupled to a CDMA network, such as a base station controller or other network controller, and the remote communication device is a wireless telecommunication device including capabilities for CDMA communication.

In another implementation, the overhead channels used in CDMA 2000 1× (First Evolution) include pilot, sync, and paging channels in the forward link and an access channel in the reverse link. The overhead channels used in CDMA 2000 1× EV-DO (First Evolution-Data Only) include pilot, sync, and control channels in the forward link and an access channel in the reverse link. In other implementations, the overhead channels include any non-traffic channels that provide reference, timing, system configuration, and access. In a CDMA application, traffic channels carry principal information such as two-way voice signals for providing telephone conversation.

The term "half-duplex mode" refers to a mode in which a communication device is permitted to act as either a transmitter or a receiver, but not both during the same communication period.

The term "low duty cycle" (LDC) refers to intermittent, occasional, and relatively low frequency of activity operation.

The term "terminal" refers generally to a substantially remotely-situated device, including a communication device.

The term "hibernate mode" refers to a mode of the communication device that places the communication device in a state of sleep and turns off all units in the communication device except for a timing device to keep track of the duration of the sleep. For LDC applications, the duration of the sleep is often substantially longer than allowable under the protocol of a conventional wireless communication network. For example, the duration of sleep is typically substantially longer than a CDMA slot cycle.

The term "idle mode" refers to a mode of the communication device where the device is awake for normal operations. For example, idle mode in a CDMA system includes slotted mode operation.

Figure 1:
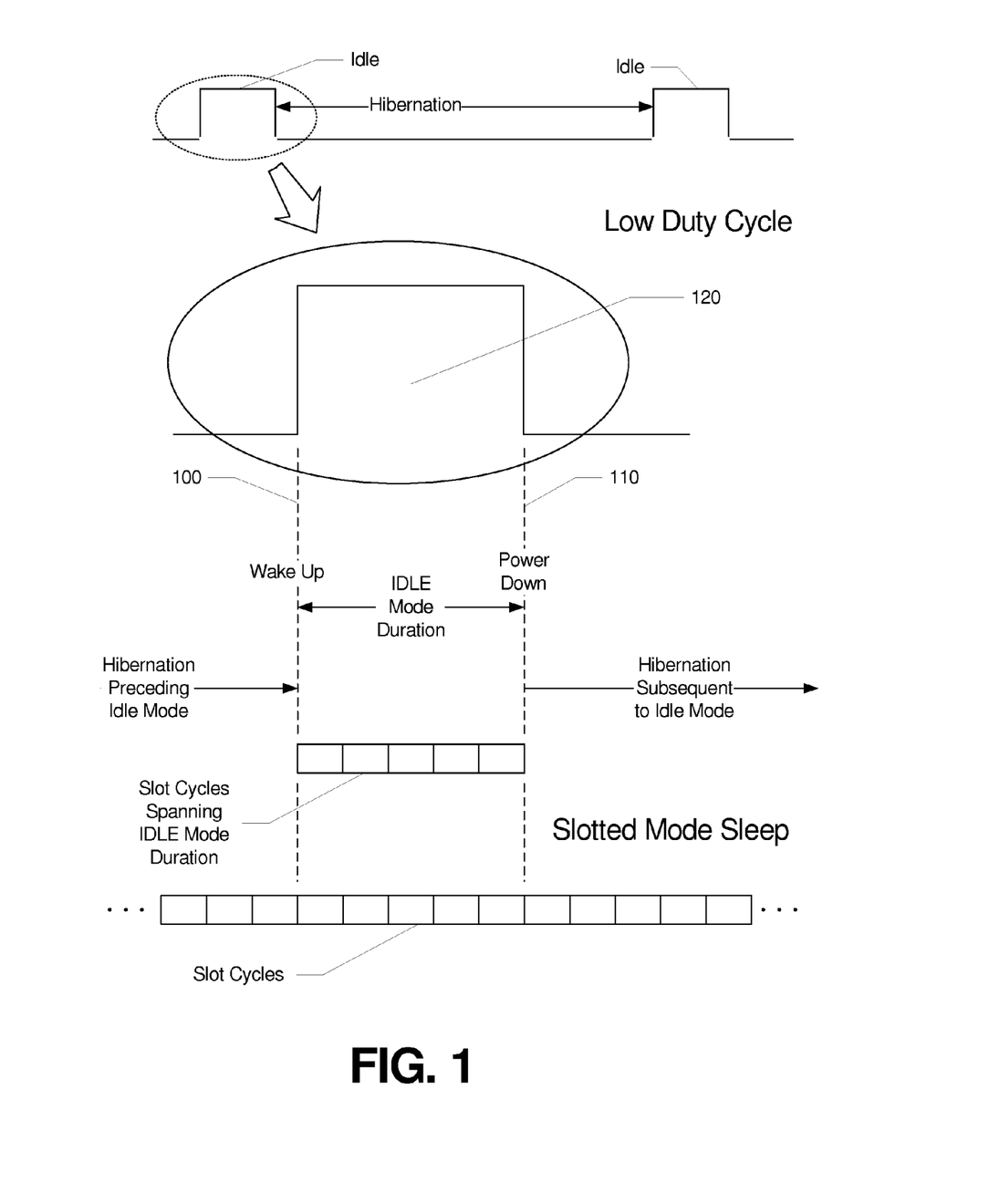
FIG. 1 illustrates an exemplary relationship between LDC operation and CDMA slotted mode sleep.

FIG. 1 illustrates how hibernate and idle modes of LDC operation relate to the slot cycles of a communication system. Such a communication system may, for example, be a CDMA-based system. Principal characteristics of LDC operation include an idle mode significantly shorter in duration than the hibernate mode, as shown at the top of FIG. 1. The close-up view of an idle mode period shows that it can be defined by a wakeup time 100 and a power down time 110. Alternatively, an idle mode may be defined by a wakeup time 100 and an idle mode duration 120. In one embodiment, the power down time 110 is dynamically adjusted according to the amount of information requiring transmission during idle mode. The close-up view further shows that a slot cycle of a CDMA system may be significantly shorter in duration than the LDC idle mode 120, shown for purposes of demonstration to span 5 slot cycles. The slot cycle essentially represents the wake/sleep cycle of a communication device under the protocol of the communication network, which under CDMA, for example, can range from 1.28 seconds (slot cycle 0) to 163.84 seconds (slot cycle 7). However, slot cycles of these durations are inappropriate for LDC purposes because a terminal's hibernate mode may extend from several minutes to a month or more, far longer than the maximum length slot cycle. Implementing a 1-month duty cycle, for example, by waking a battery-powered device every 163.84 seconds according to CDMA slot cycle 7 would cause battery depletion much sooner than waking only at the end of each 1-month cycle. Because (a) the sleep cycles provided by protocols such as CDMA that underlie existing communication infrastructures are inadequately short for the relatively long-term hibernations of LDC terminals, and (b) typical remotely-situated LDC terminals are hibernating most of the time and not accessible to the network facilitating communications, a mechanism is therefore required to synchronize communications between a centrally-situated information processing device and the terminals.

Low Duty Cycle Controller

Figure 2:
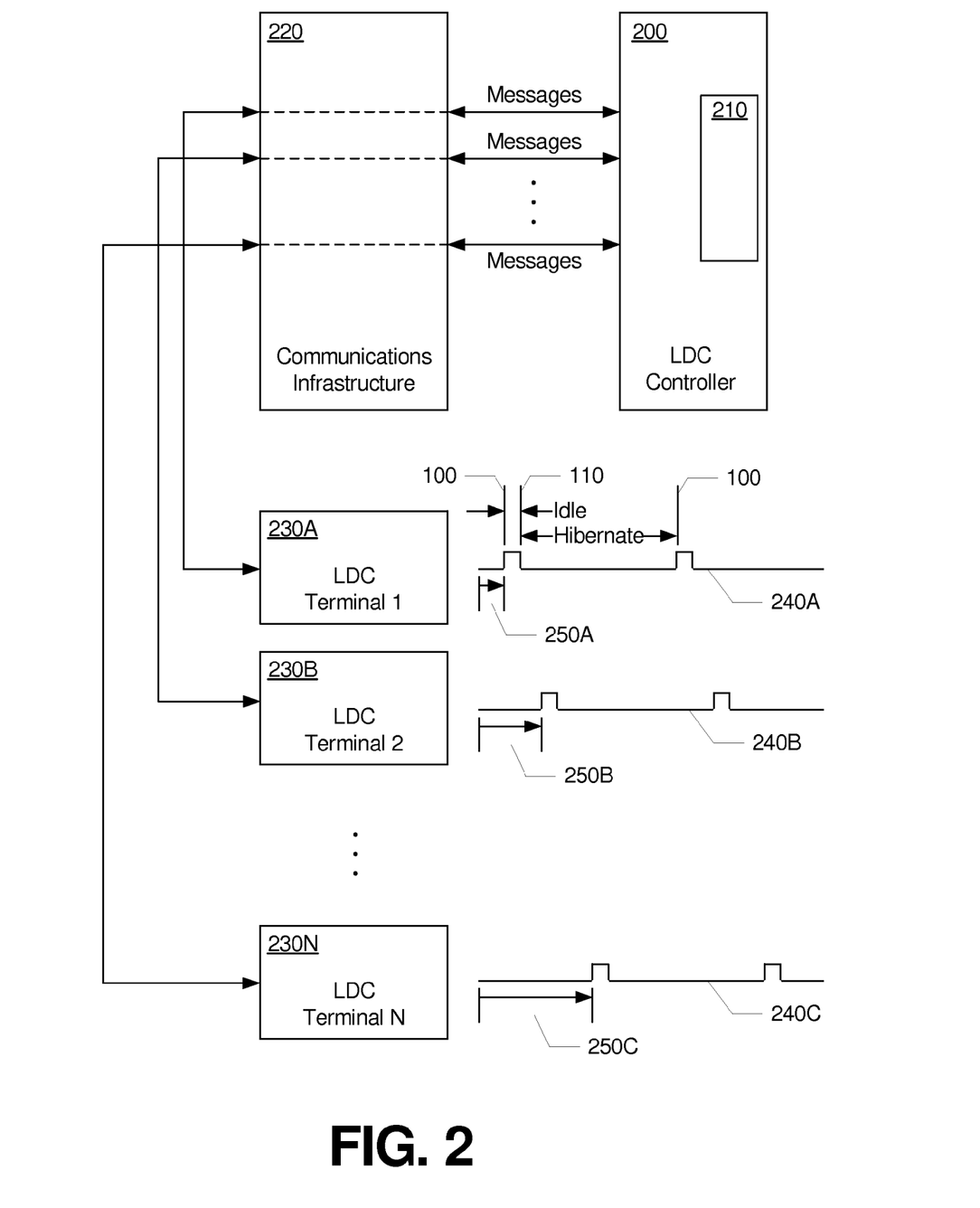
FIG. 2 is a block diagram illustrating a communication path between a LDC controller and LDC terminals using an existing communications infrastructure.

The block diagram in FIG. 2 provides an overview of the relationships between a LDC controller 200 and a plurality of LDC terminals 230A-N with which the LDC controller 200 is tasked to maintain synchronization. As shown, communications are facilitated by a communications infrastructure 220, representing an existing system for communications including, for example, wireless telephonic voice communications. In one implementation, the communications infrastructure 220 is a CDMA system. The LDC controller 200 is a process or processor typically hosted by or co-located with a centrally-situated information processor performing as a component of the communications infrastructure 220. The information processor might be, for example, a base station, a server, or a call processing center. In one implementation, there is at least one LDC controller 200.

The LDC controller 200 formulates messages that are passed into the communications infrastructure 220 for delivery to one or more of the LDC terminals 230A-N. The LDC controller 200 receives messages formulated by LDC terminals 230A-N which are passed in the reverse direction through the communications infrastructure 220. In one implementation the messages thus received by the LDC controller 200 may include information regarding the position of a terminal 230A-N, its operating mode, its wake up time, and its wake up duration. In another implementation the messages transmitted by the LDC controller 200 include configuration information for a terminal 230. Messages from a LDC terminal 230 may be stored in memory 210, as may configuration information and messages downlinked externally and scheduled by the LDC controller 200 for transmission to the LDC terminal 230.

Synchronization is required between the LDC controller 200 and the terminals 230A-N because the relatively long hibernation intervals of the LDC terminals 230A-N make them inaccessible to the network underlying the communications infrastructure 220. A usage profile 240A depicted in FIG. 2 exhibits LDC operational parameters such as a wake up time 100, power down time 110, and an offset 250A from a timing reference. Similarly, the other usage profiles 240B, 240C as shown depict offsets 250B, 250C of different durations. Offsets will be discussed in more detail below. At wake up 100 the LDC terminal 230A enters idle mode. In one implementation using a CDMA communications system, activities performed by a LDC terminal 230 during idle mode include typical slotted mode operations such as listening to a paging channel, receiving messages, and sending messages. At power down 110 a terminal 230 A-N enters hibernation mode, during which time a LDC terminal 230A-N is substantially asleep, except for maintaining a timing reference, to minimize power drain on the battery. Communications between a LDC controller 200 and a LDC terminal 230 must therefore be synchronized so that they occur during the LDC terminal's 230 idle mode, and are not attempted during its hibernation. Advantages provided include those due to enabling synchronization of communications in a way that non-invasively overlays the protocols of the existing communications infrastructure.

Figure 3:
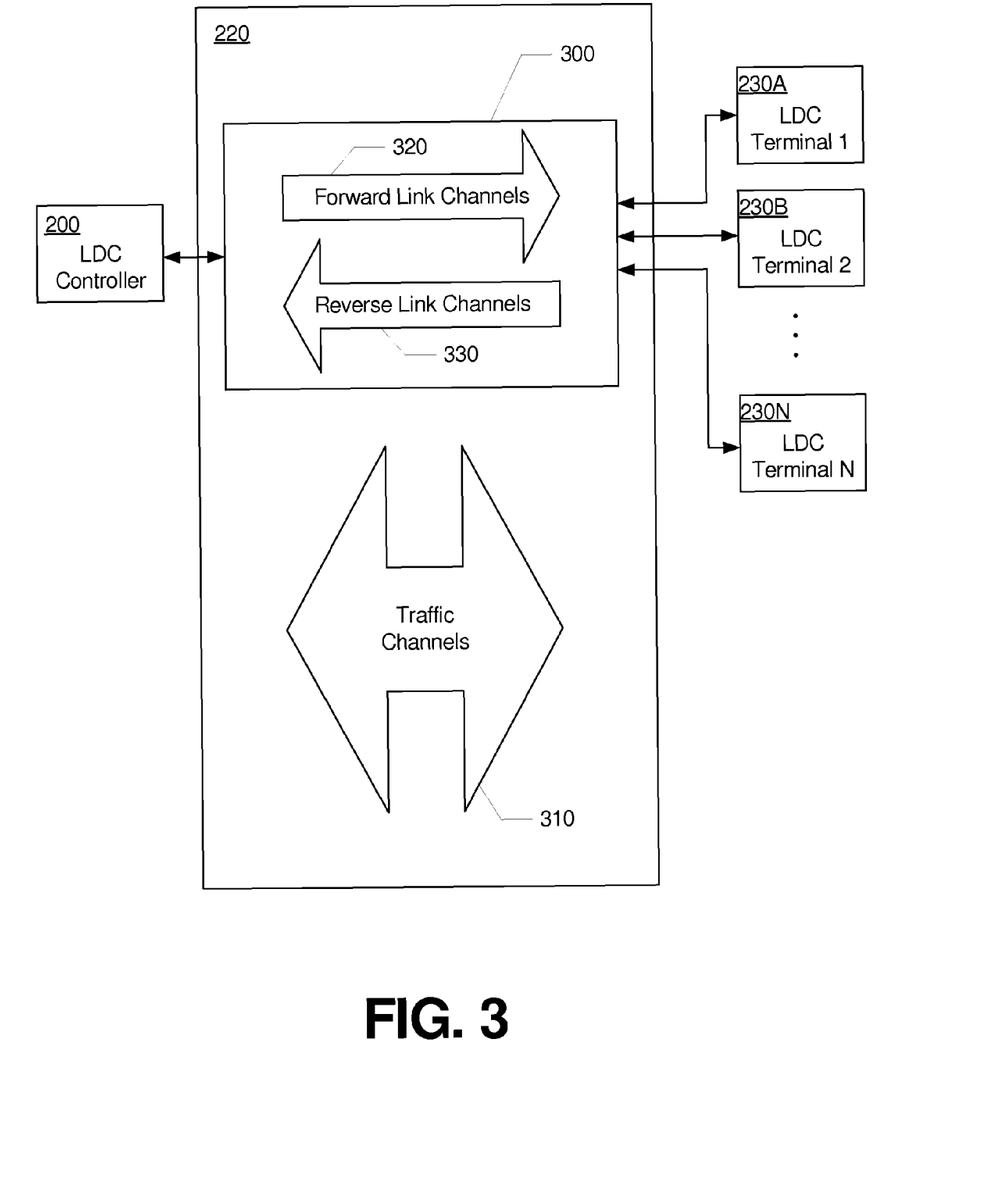
FIG. 3 illustrates half-duplex usages of overhead channels of a communications infrastructure to facilitate messaging between a LDC controller and LDC terminals.

FIG. 3 is a block diagram exemplifying a typical CDMA communications infrastructure 220. A category of channels called overhead channels 300 is shown separated from the traffic channels 310. Traffic channels 310 include the full-duplex channels used for voice communications, for example, and are typically assigned to individual users to carry all traffic. Overhead channels 300 include half-duplex forward link channels 320 and reverse link channels 330. The forward link channels 320 include pilot channels providing beacon functionality for initial system acquisition, sync channels for carrying system parameters required at system acquisition, and paging channels used to carry overhead messages, pages, setup messages, and orders. The reverse link channels 330 typically include access channels, use by a remote device to transmit registration requests, call setup requests, page responses, order responses, and other signally information required by system protocols.

One embodiment of the present invention provides for maintenance of synchronization by a LDC controller 200 with a plurality of LDC terminals 230A-N using the protocol and timing of the network underlying only the half-duplex communication channels. However, the scheduling inherent to the synchronization does not rely for its own timing on the protocols and timing of the network, and so is separate from those protocols and timing. Synchronization is essentially overlaid on the protocols needed to facilitate principal communications over the overhead channels 300.

For example, in one implementation, communications by a LDC controller 200 with LDC terminals 230 while the LDC terminals 230 are in idle mode conform in and of themselves to a CDMA slotted mode protocol. Whereas, the schedule implementing synchronization is defined substantially without reference to the timing inherent to the CDMA slotted mode protocol. That is, by further example, a configuration message including information regarding a wake up time 100 and a power down time 110 sent from a LDC controller 200 to a LDC terminal 230A is transmitted in conformance to the timing and protocol of the communications network, but the actual wake up and power down of the terminal 230A conforms to the information included in the message, not necessarily in conformance with the timing and protocol of the network that carried the message. Extended hibernation intervals of the LDC terminals 230A-N may thus be accommodated because the timing inherent to the protocols of the communications infrastructure 220 (e.g., CDMA slotted mode sleep) is not necessarily a factor in synchronization scheduling.

Figure 4:
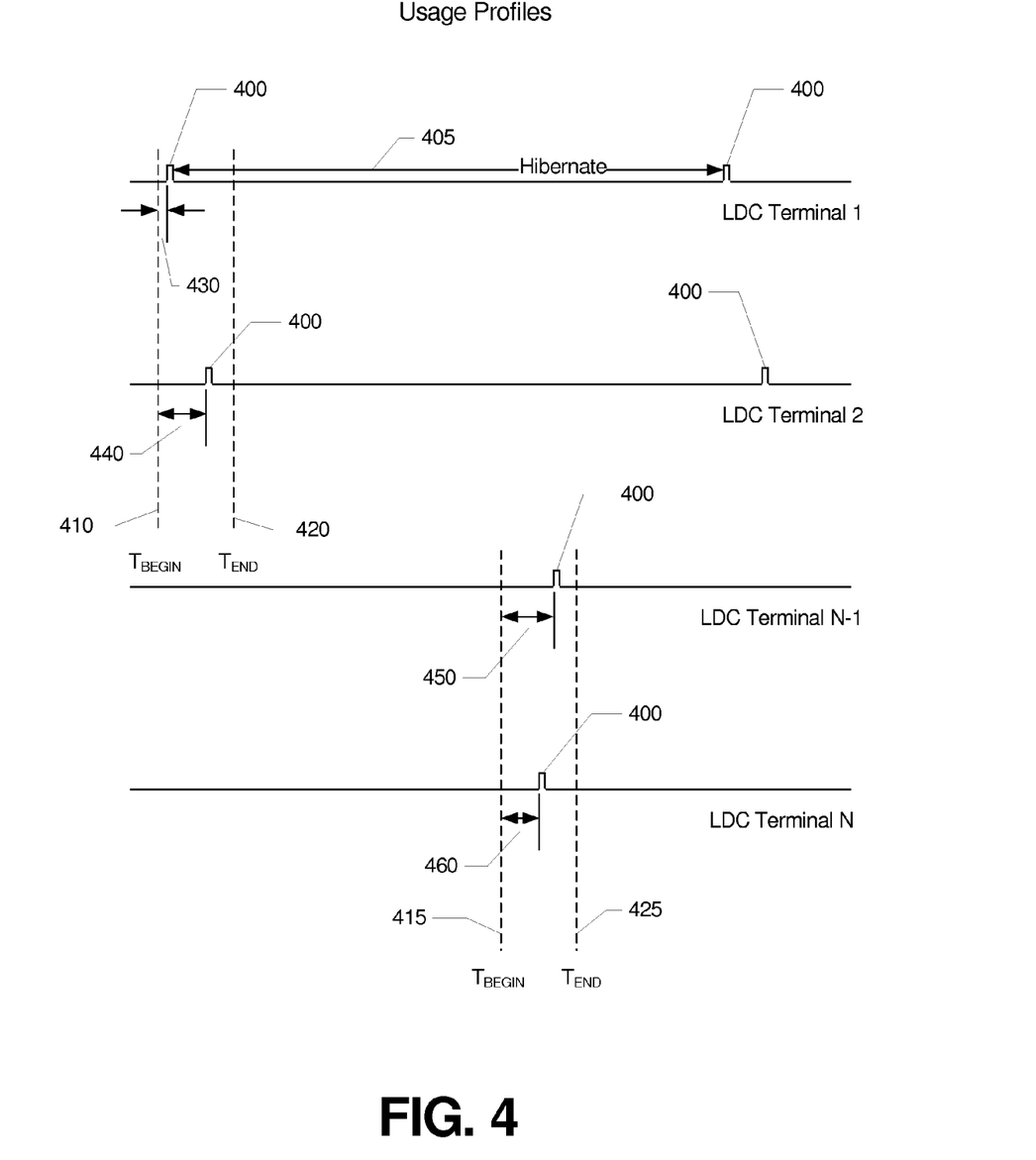
FIG. 4 illustrates a hashing of LDC wakeup times.

In one implementation, a LDC controller 200 provides configuration information to LDC terminals 230, where the information includes synchronization parameters defining a time window. Shown in FIG. 4 are four exemplary usage profiles assigned to four LDC terminals 230 identified as LDC terminals 1, 2, N−1 and N. The usage profile for LDC terminal 1 depicts two idle mode periods 400 and an intervening hibernation mode 405. The usage profile for LDC terminal 2 is substantially identical to that of LDC terminal 1 except for a time shift to the right. The usage profiles for LDC terminals 1 and 2 are overlaid by dashed lines 410, 420 indicating times $T_{BEGIN}$ and $T_{END}$, respectively. $T_{BEGIN}$ and $T_{END}$ are configuration parameters provided by the LDC controller 200 which enable maintenance of a common timing reference between the LDC controller 200 and LDC terminals 230. More specifically, $T_{BEGIN}$ and $T_{END}$ bracket a period during which the LDC terminals 1 and 2 are to enter and leave idle mode 400. That is, the LDC controller 200 instructs a LDC terminal 230 to wake up at some time within the interval defined by $T_{BEGIN}$ and $T_{END}$, and to be in hibernate mode at times exterior to that interval. Given the values $T_{BEGIN}$ and $T_{END}$, wake up times 100 for LDC terminals 1 and 2 may be defined as offsets 430, 440, respectively, from $T_{BEGIN}$. Offsets 430, 440 are typically determined by a hashing process to distribute the wake up times 100 substantially evenly over the interval defined by $T_{BEGIN}$ and $T_{END}$. Similar time windows for LDC terminals N−1 and N are defined by dashed lines 415, 425, respectively, within which offsets 450, 460 are hashed to define corresponding wake up times 100. In one implementation, hashing is performed by each LDC terminal 230A-N for itself. In another implementation, hashing is performed by the LDC controller 200 and the result communicated to the LDC terminal 230.

A LDC controller 200 thus provides parameters $T_{BEGIN}$ and $T_{END}$ to LDC terminals 1, 2, N−1 and N. LDC terminals 1 and 2 receive values defining a first window of time, and LDC terminals N−1 and N receive values defining a second window. Wake up times 100 are hashed for LDC terminals 1 and 2 in the form of offsets 430, 440 from $T_{BEGIN}$ associated with the first window, and wake up times 100 for LDC terminals N−1 and N are hashed in the form of offsets 450, 460 from $T_{BEGIN}$ associated with the second window. Messages transmitted by the LDC terminals 1, 2, N−1 and N to a LDC controller 200 are thereby substantially evenly distributed in time when received at the LDC controller 200 so as to prevent, for example, uneven loads on overhead channels 300 and at the LDC controller 200. In one implementation, the LDC controller is not advised of the power down times 110 of the LDC terminals 230A-N, where instead the LDC terminals 230A-N merely cease transmitting messages until the next wake up time 100 occurs.

A usage profile is substantially defined according to an operational mode required of a LDC terminal 230. For example, an operational mode accommodating periodic meter reading may define a usage profile in which a wake up time 100 is scheduled to occur once a month. Another example is an operational mode accommodating vehicle position reports from a LDC terminal 230, for which a usage profile scheduling wake up times 100 once per hour may be appropriate. Yet another example includes a so-called SOS mode, in which emergency position reports from a LDC terminal 230 coupled to a person may require a usage profile scheduling transmissions once every five minutes.

Figure 5:
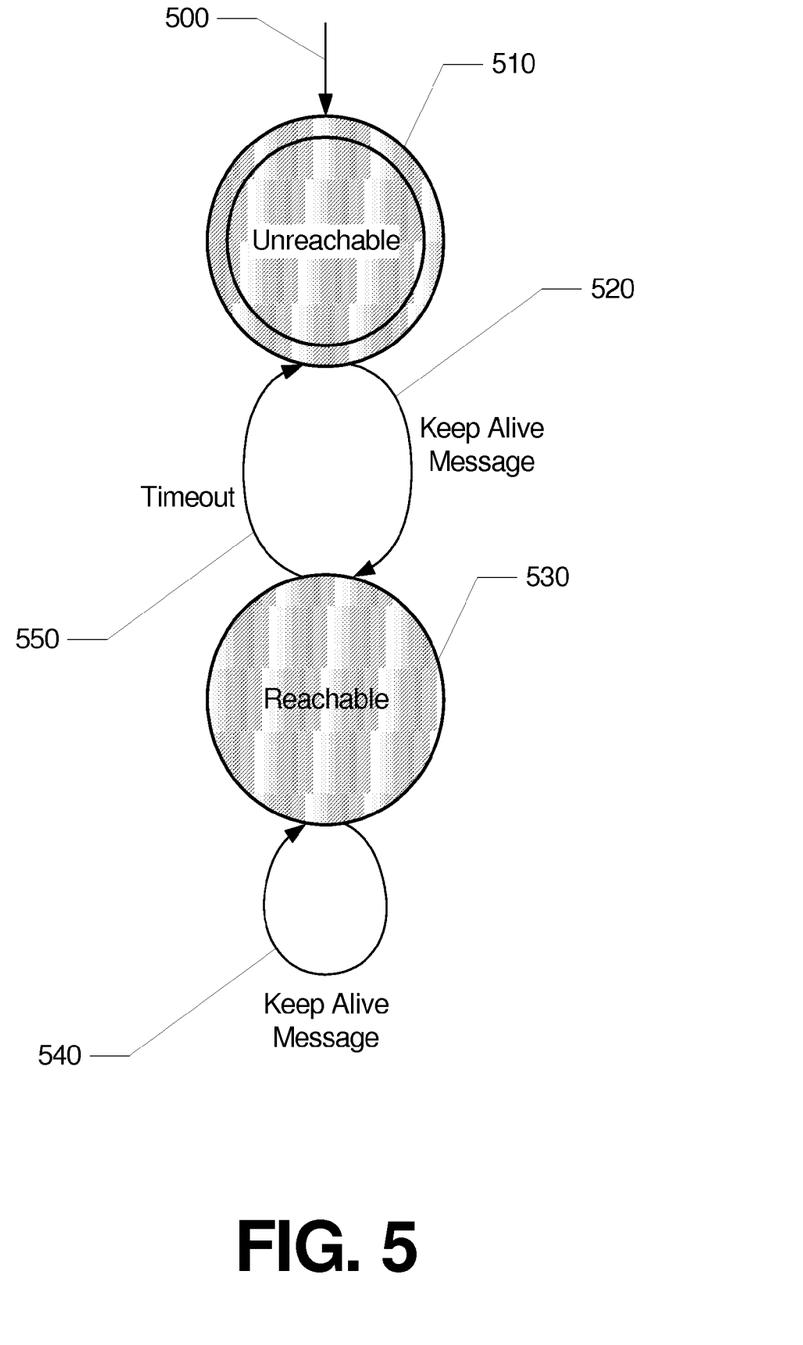
FIG. 5 illustrates a state machine modeling the reachability status of a LDC terminal.

In one implementation, synchronization by a LDC controller 200 with a LDC terminal 230 involves a reachability state on the part of the LDC terminal 230. A state-machine depicting states of reachability is shown in FIG. 5. Initially 500, the LDC terminal 230 is unreachable 510. When a keep alive (KA) message 520 is received by the LDC controller 200 from the LDC terminal 230, a state of reachability 530 is established. The LDC controller 200 may therefore regard the LDC terminal 230 as being in idle mode, for example, indicating that subsequent communication may be commenced. Further KA messages 540 received by the LDC controller 200 from the LDC terminal 230 each maintain the reachable state 530. If a timeout 550 occurs, i.e., the LDC controller 200 fails to receive a KA message from the LDC terminal 230 before a predetermined amount of time has elapsed, the LDC controller 200 regards the LDC terminal 230 as unreachable 510. Thus, when regarded as unreachable by the LDC controller 200, an LDC terminal 230 may also be assumed, for example, to be in hibernate mode. Upon receiving a subsequent KA message 520 from the LDC terminal 230, the LDC terminal 200 regards the LDC terminal 230 as once again reachable 530.

In one implementation, when receiving a KA message from a LDC terminal 230, the LDC controller 200 marks the LDC terminal 230 as reachable and saves the current time as the last received KA message timestamp. If more than a predetermined time interval elapses without the LDC controller 200 receiving a subsequent KA message from the LDC terminal 230, or the LDC controller 200 fails to send messages to the LDC terminal 230 for some predetermined number of hibernation intervals, then the LDC controller 200 marks the LDC terminal 230 as unreachable. If the LDC controller 200 has marked the LDC terminal 230 as unreachable because of its failure to send messages to the LDC terminal 230 for some predetermined number of hibernation intervals, and the LDC controller 200 subsequently receives a KA message from the LDC terminal 230 thus marked as unreachable, the LDC controller 200 may send a configuration message to the LDC terminal 230 to reestablish synchronization.

In another implementation, usage profiles are distinguished between those that provide for wake up times 100 of a LDC terminal 230 at resolutions of less than one day, and those that provide wake up times 100 at resolutions of one day or greater. In the former case, synchronous scheduling is implemented, and in the latter case, asynchronous scheduling is used.

Figure 6:
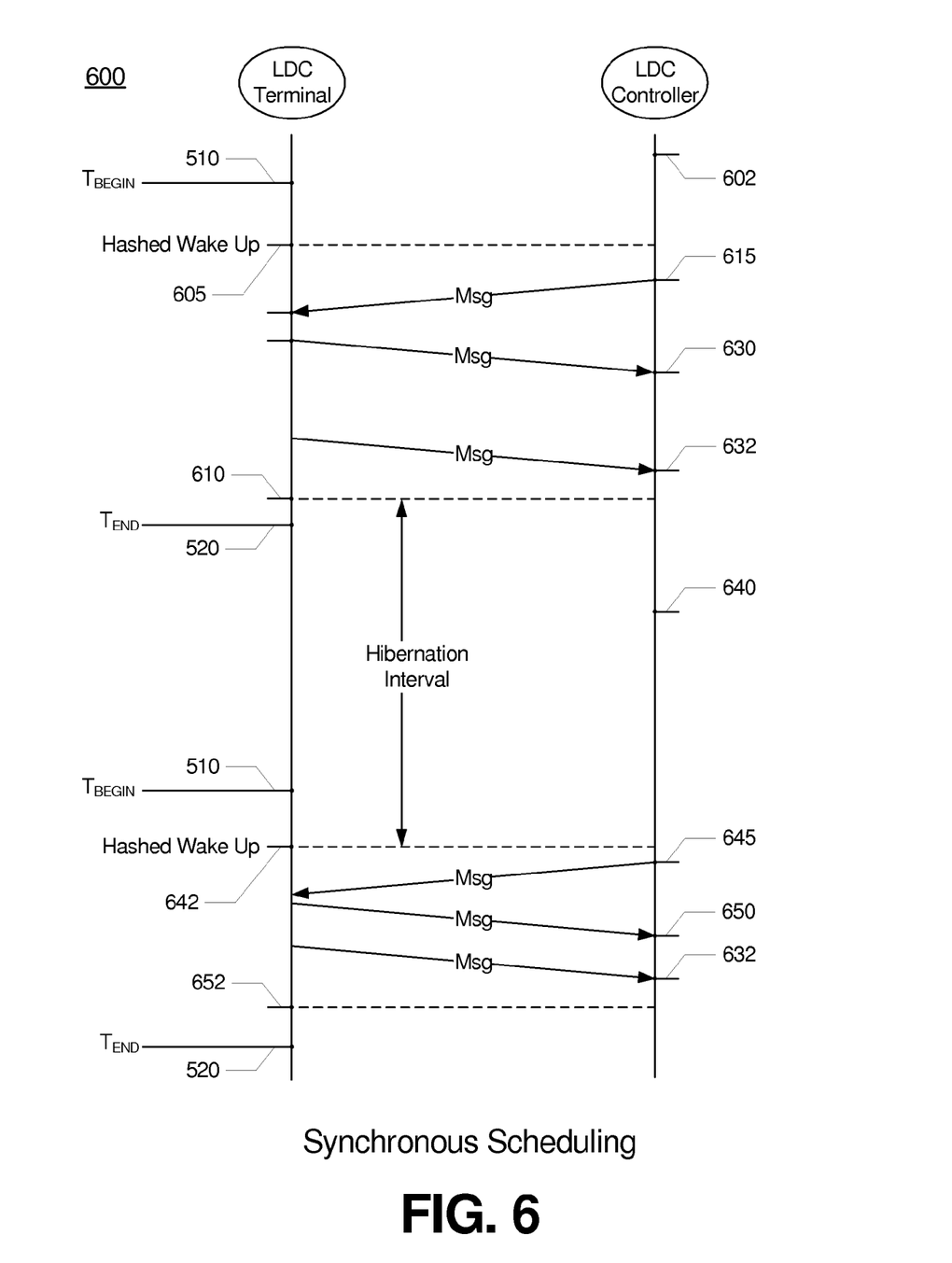
FIG. 6 is a timeline illustrating synchronous scheduling using a LDC controller.

Synchronous scheduling 600 as used in one implementation is illustrated in FIG. 6. Shown are timelines for a LDC controller 200 and a LDC terminal 230. It will be appreciated that FIG. 6 depicts timelines for a single LDC controller 200 and a single LDC terminal 230, and that implementations of the present invention provide for at least one LDC controller 200 and a plurality of LDC terminals 230A-N. A wake up time 605 for the LDC terminal 230 based on $T_{BEGIN}$ 510 has been hashed and is known to both the LDC controller 200 and the LDC terminal 230. The LDC controller 200 has received messages for the LDC terminal 230, which have been stored and sorted in memory 210 according to destination LDC terminal 230 and time of future transmission. At substantially wake up time 605 the LDC controller 200 sends 615 a message including any stored messages for the LDC terminal 230. The message is received 620 at the LDC terminal 230. A responsive message is received by the LDC controller 200, from the LDC terminal 230. Before power down time 610 is reached, the LDC controller 200 may receive 632 one or more messages from the LDC terminal 230. Such a message may be, for example, a KA message including information regarding operational status, battery status, network information, and a request for configuration data. In one implementation, after $T_{END}$ occurs and the LDC terminal 230 is regarded as being in hibernate mode, the LDC controller 200 may select 640 pending messages for the LDC terminal 230 and schedule them for the next transmission time, coinciding with the next idle mode period of the LDC terminal 230. At substantially the next wake up time 642 the LDC controller sends 645 the pending messages to the LDC terminal 230, after which the LDC controller 200 receives 650 a message from the LDC terminal 230. The LDC controller 200 may continue to receive 632 further messages such as KA messages depending upon the amount of time left before the power down time 652. In another implementation, the power down time 610, 652 is dynamically adjusted according to the number and nature of the messages sent and received by the LDC controller 200. For example, if the number of pending messages is too large to be carried by a single message sent 615, 645 by the LDC controller 200, then only a portion will be sent 615, 645. Upon receiving 630, 650 a message from the LDC terminal 230, the LDC controller 200 may then reset and extend the power down time 610, 652. The LDC controller 200 may then send (not shown) a subsequent portion or the remainder of the pending messages in a similar manner to before. This process may be continued until all of the pending messages are sent by the LDC controller 200.

Figure 7:
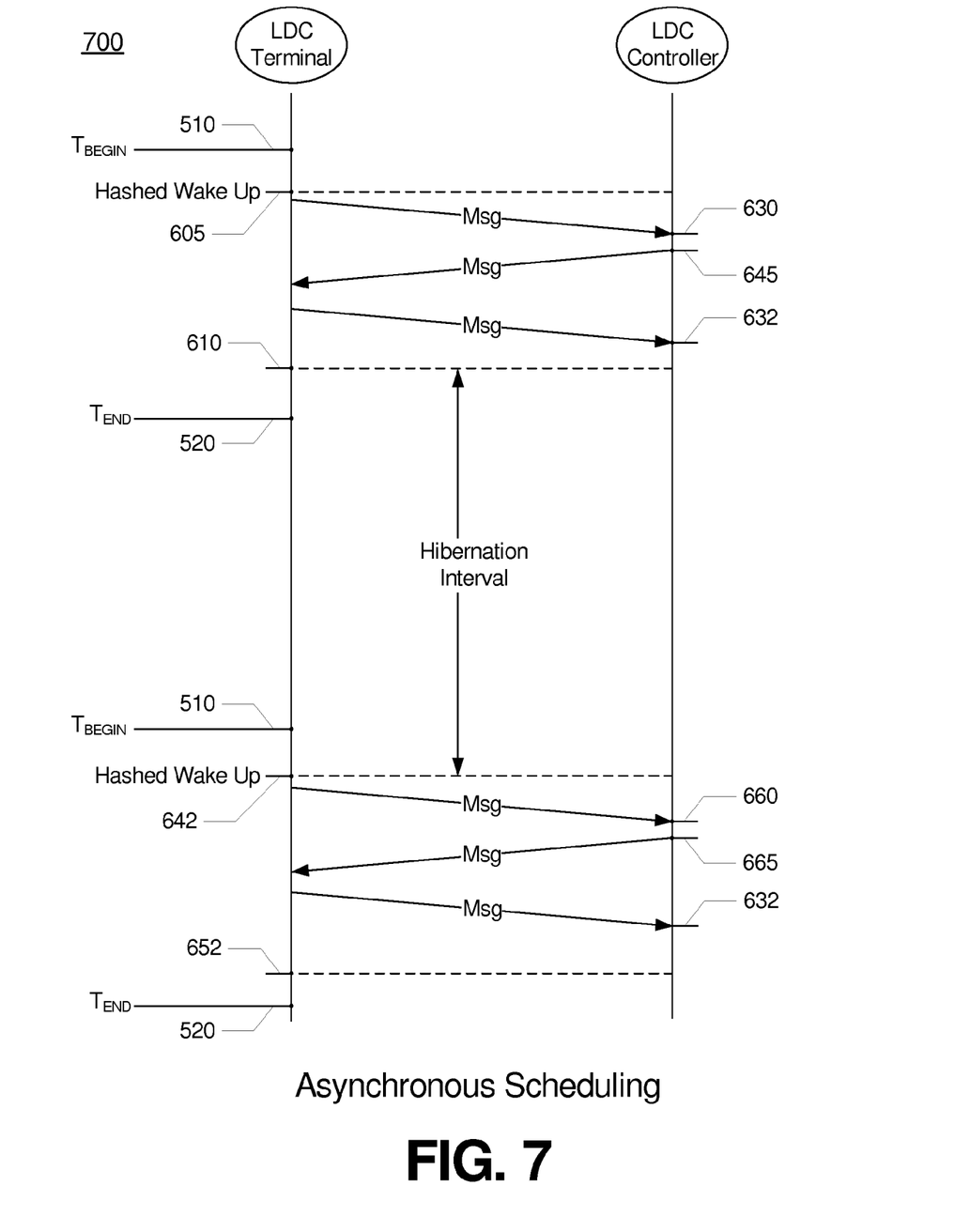
FIG. 7 is a timeline illustrating asynchronous scheduling using a LDC controller.

FIG. 7 illustrates asynchronous scheduling 700 as performed in one implementation in which a usage profile instructs wake up times 100 at a resolution greater than one day. The LDC controller 200 initially regards the LDC terminal 230 as unreachable. The LDC controller 200 does nothing with respect to the LDC terminal 230 until it receives 630 an unsolicited message sent by the LDC terminal 230 after its hashed wake up time 605. The LDC controller 200 formulates and sends 645 a message including any pending messages stored in memory 210 and scheduled for transmission. If the number of pending messages is too large to be included by the message sent by the LDC controller 200 to the LDC terminal 230, then upon receiving 632 another message from the LDC terminal 230, the LDC controller 200 responds by sending (not shown) a subsequent portion or the remainder of the pending messages in a similar manner to before. In an implementation of the present invention, the LDC controller 200 continues to receive 632 messages from the LDC terminal 230 until substantially the power down time 610. Such messages may include KA messages as discussed in relation to synchronous scheduling illustrated in FIG. 6. In another implementation, the power down time 610, 652 is dynamically adjusted according to the number and nature of the messages sent and received by the LDC controller 200. For example, if the number of pending messages is too large to be carried by a single message sent 645, 665 by the LDC controller 200, then only a portion will be sent 615, 645. Upon receiving 632 a message from the LDC terminal 230, the LDC controller 200 may reset and extend the power down time 610, 652 until which the LDC terminal 230 will remain in idle mode. The LDC controller 200 may then send a subsequent portion or the remainder of the pending messages in a similar manner to before. The process is continued until all of the pending messages are sent by the LDC controller 200. At substantially the next wake up time 642 the LDC controller again receives 660 an unsolicited message from the LDC terminal 230.

Applications

Implementations of LDC controller operation described above can be used in many different applications including asset tracking, automated meter reading, cashless payment of parking meters, traffic lights and sensors, billboards and public displays, real-time health monitoring, home/office security and alarm systems, automotive telematics, utility distribution grid monitoring, position monitoring using GPS, and other related polling applications. Message transmission for these applications can range from an average of one short messaging service (SMS) message per hour for an asset tracking application to one SMS message per month for an automated meter reading application.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and features disclosed herein.

What is claimed is:

1. A Low Duty Cycle (LDC) controller for use in a communications network, comprising:
    a processor programmed to:
        formulate synchronization information to maintain synchronization between the LDC controller and a plurality of terminals in the communications network, wherein the synchronization information is maintained separately and does not rely on protocols and timing associated with the communications network; and,
    a transmitter configured to transmit the synchronization information on a half-duplex forward link channel of the communications network to at least one of the plurality of terminals.

2. The LDC controller of claim 1, wherein the synchronization information includes a power down time period that is longer in duration than allowable under the protocol and timing of the communications network.

3. The LDC controller of claim 1, wherein the synchronization information includes a wake up time period that is longer in duration than allowable under the protocol and timing of the communications network.

4. The LDC controller of claim 1, wherein the synchronization information includes a time period and the processor is programmed to hash a plurality of wake up times over the time period.

5. The LDC controller of claim 1, comprising a receiver configured to receive terminal message information on a half-duplex reverse link channel.

6. The LDC controller of claim 5, wherein the synchronization information includes a power down time and the processor is programmed to formulate the power down time based on the received terminal message information.

7. A system for synchronizing a plurality of terminals in a communications network, comprising:
    means for formulating synchronization information to maintain synchronization between a Low Duty Cycle (LDC) controller and the plurality of terminals in the communications network;
    means for maintaining the synchronization information separately and without relying on protocols and timing associated with the communications network; and
    means for transmitting the synchronization information on a half-duplex forward link channel of the communications network to at least one of the plurality of terminals.

8. The system of claim 7, wherein the synchronization information includes a power down time period that is longer in duration than allowable under the protocol and timing of the communications network.

9. The system of claim 7, wherein the synchronization information includes a wake up time period that is longer in duration than allowable under the protocol and timing of the communications network.

10. The system of claim 7, wherein the synchronization information includes a time period and the processor is programmed to hash a plurality of wake up times over the time period.

11. The system of claim 7, comprising means for receiving terminal message information on a half-duplex reverse link channel.

12. The system of claim 11, wherein the synchronization information includes a power down time and the means for formulating the power down time based on the received terminal message information.

13. A non-transitory computer-readable medium having computer-executable instructions for performing a method comprising:
    formulating synchronization information to maintain synchronization between a Low Duty Cycle (LDC) controller and a plurality of terminals in a communications network, wherein the synchronization information is maintained separately and does not rely on protocols and timing associated with the communications network; and,
    transmitting the synchronization information on a half-duplex forward link channel to at least one of the plurality of terminals of the communications network.

14. The computer-readable medium of claim 13, wherein the synchronization information includes a power down time period that is longer in duration than allowable under the protocol and timing of the communications network.

15. The computer-readable medium of claim 13, wherein the synchronization information includes a wake up time period that is longer in duration than allowable under the protocol and timing of the communications network.

16. The computer-readable medium of claim 13, wherein the synchronization information includes a time period and the computer-executable instructions include hashing a plurality of wake up times over the time period.

17. The computer-readable medium of claim 13, comprising computer-executable instructions for receiving a terminal message information on a half-duplex reverse link channel.

18. The computer-readable medium of claim 17, wherein the synchronization information includes a power down time and including computer-executable instructions for formulating the power down time based on the terminal message information.

19. A method of sending synchronization information, comprising:
    formulating synchronization information to maintain synchronization between a Low Duty Cycle (LDC) controller and a plurality of terminals in a communications network, wherein the synchronization information is maintained separately and does not rely on protocols and timing associated with the communications network; and,
    transmitting the synchronization information on a half-duplex forward link channel of the communications network to at least one of the plurality of terminals.

20. The method of claim 19, wherein the synchronization information includes a power down time period that is longer in duration than allowable under the protocol and timing of the communications network.

21. The method of claim 19, wherein the synchronization information includes a wake up time period that is longer in duration than allowable under the protocol and timing of the communications network.

22. The method of claim 19, wherein the synchronization information includes a time period and the method comprises hashing a plurality of wake up times over the time period.

23. The method of claim 19, comprising receiving a terminal message information on a half-duplex reverse link channel.

24. The method of claim 23, wherein the synchronization information includes a power down time and the method comprises formulating the power down time based on the terminal message information.

* * * * *